(12) United States Patent
Strandell et al.

(10) Patent No.: US 9,210,232 B2
(45) Date of Patent: Dec. 8, 2015

(54) METHOD AND APPARATUS FOR ADAPTIVE MEDIA TRANSFER

(75) Inventors: Toni Strandell, Helsinki (FI); Elina Vartiainen, Helsinki (FI); Janne P. Kaasalainen, Espoo (FI); Timo Pakkala, Espoo (FI); Antti M. Helander, Oulu (FI); Kristian A. Luoma, Oulu (FI)

(73) Assignee: Nokia Technologies Oy, Espoo (FI)

( * ) Notice: Subject to any disclaimer, the term of this patent is extended or adjusted under 35 U.S.C. 154(b) by 992 days.

(21) Appl. No.: 12/393,664

(22) Filed: Feb. 26, 2009

(65) Prior Publication Data
US 2010/0217794 A1 Aug. 26, 2010

(51) Int. Cl.
G06F 15/16 (2006.01)
H04L 29/08 (2006.01)

(52) U.S. Cl.
CPC ............ *H04L 67/2804* (2013.01); *H04L 67/26* (2013.01); *H04L 67/306* (2013.01)

(58) Field of Classification Search
CPC ... H04L 67/26; H04L 67/2804; H04L 67/306; H04L 67/30; H04L 67/2814
USPC .................................. 709/217, 219, 226, 232
See application file for complete search history.

(56) References Cited

U.S. PATENT DOCUMENTS

| | | | |
|---|---|---|---|
| 6,381,651 B1 | 4/2002 | Nishio et al. | |
| 7,680,882 B2 * | 3/2010 | Tiu et al. ........................ | 709/203 |
| 2004/0070678 A1 | 4/2004 | Toyama et al. | |
| 2005/0286859 A1 | 12/2005 | Komi et al. | |
| 2006/0136520 A1 | 6/2006 | Leppinen et al. | |
| 2007/0022174 A1 * | 1/2007 | Issa ................. | 709/217 |
| 2007/0130015 A1 * | 6/2007 | Starr et al. ....................... | 705/14 |
| 2007/0157105 A1 * | 7/2007 | Owens et al. .................. | 715/771 |
| 2007/0226146 A1 | 9/2007 | Ruul | |
| 2007/0226223 A1 | 9/2007 | Lindsley | |
| 2008/0109306 A1 * | 5/2008 | Maigret et al. .................. | 705/14 |
| 2008/0224902 A1 | 9/2008 | Samuels et al. | |
| 2008/0235592 A1 * | 9/2008 | Trauth ........................... | 715/733 |
| 2008/0282174 A1 * | 11/2008 | Sauve et al. .................... | 715/748 |
| 2009/0007188 A1 * | 1/2009 | Omernick ........................ | 725/62 |
| 2009/0144392 A1 * | 6/2009 | Wang et al. ..................... | 709/217 |
| 2009/0156181 A1 * | 6/2009 | Athsani et al. ............. | 455/414.2 |
| 2009/0249244 A1 * | 10/2009 | Robinson et al. ............. | 715/781 |
| 2009/0292762 A1 * | 11/2009 | Mettala et al. ................. | 709/203 |
| 2009/0307345 A1 * | 12/2009 | Carter et al. .................. | 709/224 |

(Continued)

OTHER PUBLICATIONS

"Efficient and Transparent Dynamic Content Updates for Mobile Clients"; Trevor Armstrong, Olivier Trescases, Cristiana Amza, Eyal de Lara; On pp. 56-68; Publication date: 2006; (http://portal.acm.org/citation.cfm?id=1134680.1134687).

(Continued)

*Primary Examiner* — Phuoc Nguyen
*Assistant Examiner* — Davoud Zand
(74) *Attorney, Agent, or Firm* — Ditthavong & Steiner, P.C.

(57) ABSTRACT

An approach is provided for optimizing data (e.g., media) transfer. Retrieval is initiated for information relating to transfer of media to one or more devices. It is determined whether a particular media that is to be transferred to the one or more devices is new to the one or more devices using the retrieved information. Transfer of the particular media to the devices is initiated in which the particular media is determined to be new.

17 Claims, 11 Drawing Sheets

(56) References Cited

U.S. PATENT DOCUMENTS

| | | | |
|---|---|---|---|
| 2010/0077017 A1* | 3/2010 | Martinez et al. | 709/201 |
| 2010/0198698 A1* | 8/2010 | Raleigh et al. | 705/26 |
| 2010/0217794 A1* | 8/2010 | Strandell et al. | 709/203 |
| 2013/0066863 A1* | 3/2013 | Rose | 707/730 |
| 2014/0195919 A1* | 7/2014 | Wieder | 715/730 |

OTHER PUBLICATIONS

"Middleware Service for Mobile Ad Hoc Data Sharing, Enhancing Data Availability"; Malika Boulkenafed, Valérie Issarny; vol. 2672/2003; On pp. 999; Publication date: Jan. 1, 2003; (http://www.springerlink.com/content/yw54kjpvdkctek8y/).

\* cited by examiner

METHOD AND APPARATUS FOR ADAPTIVE MEDIA TRANSFER

BACKGROUND

Wireless (e.g., cellular) service providers continue to provide more enhanced network services and applications. Consequently, manufacturers of mobile devices (e.g., cellular phones) are challenged to continually add greater functional capabilities in smaller form factors. Beyond the already advanced telephony and data capabilities, these devices can include other sophisticated functions and applications. Recent developments enable users of mobile devices to share data related to various types of media (e.g., sound, image, and video) with other users.

For example, media sharing (e.g., image sharing) applications have emerged as one of the most widely used and popular applications over the global Internet, and thus have attracted greater interest in deployment within wireless devices. Media sharing applications, however, place a heavy load on network traffic and storage capacity when actively sharing media resources. Consequently, sharing data through wireless devices may impose a threat on the users' privacy. Therefore, to be competitive, the manufacturers need to address the ever growing requirement for more approaches for management of shared media.

Some Exemplary Embodiments

Therefore, there is a need for an approach for optimizing media data transfer and providing privacy measures for shared data.

According to one embodiment, a computer-readable storage medium carrying one or more sequences of one or more instructions which, when executed by one or more processors, cause the one or more processors to at least perform initiating retrieval of information relating to transfer of media to one or more devices. The one or more processors are caused to perform steps further determining whether a particular media that is to be transferred to the one or more devices is new to the one or more devices using the retrieved information. The one or more processors are caused to perform steps further comprising initiating transfer of the particular media to the devices in which the particular media is determined to be new.

According to another embodiment, an apparatus comprises a processor and a memory storing executable instructions that if executed cause the apparatus to initiate retrieval of information relating to transfer of media to one or more devices. The processor and memory are also configured to determine whether a particular media that is to be transferred to the one or more devices is new to the one or more devices using the retrieved information. The processor and memory are further configured to initiate transfer of the particular media to the devices in which the particular media is determined to be new.

According to yet another embodiment, a method comprises initiating retrieval of information relating to transfer of media to one or more devices. The method also comprises determining whether a particular media that is to be transferred to the one or more devices is new to the one or more devices using the retrieved information. The method further comprises initiating transfer of the particular media to the devices in which the particular media is determined to be new.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

A method and apparatus for providing media transfer and a setting the privacy level for shared media are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although certain embodiments of the invention are discussed with respect to media sharing involving media such as images and push technology, it is recognized by one of ordinary skill in the art that the exemplary embodiments of the inventions have applicability to any type of media and other delivery mechanisms.

Figure 1A:
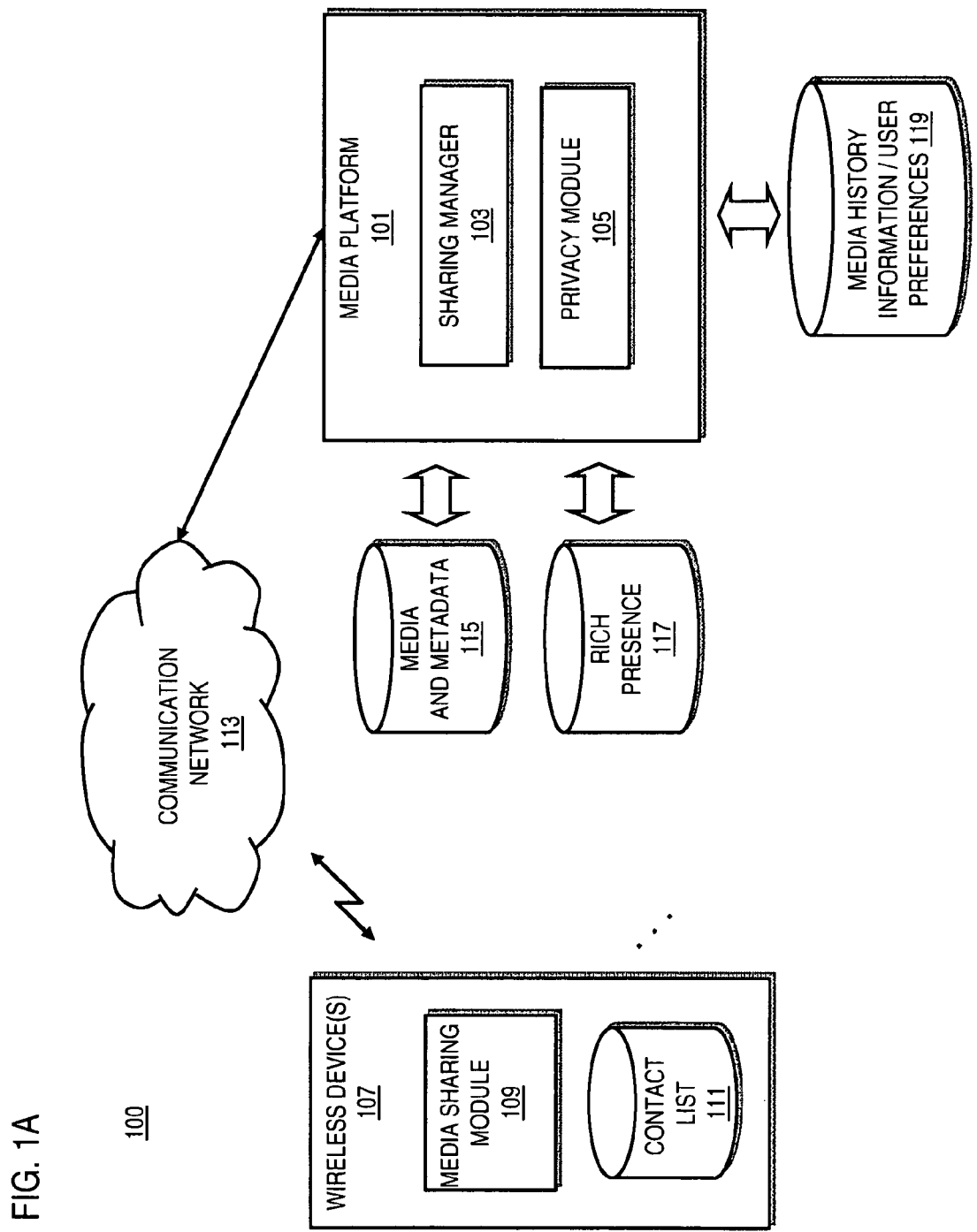
FIGS. 1A and 1B are, respectively, a diagram of a communication system capable of providing media transfer and ensuring data privacy through rich presence information, and a flowchart of media transfer process, according to certain embodiments.
Figure 1B:
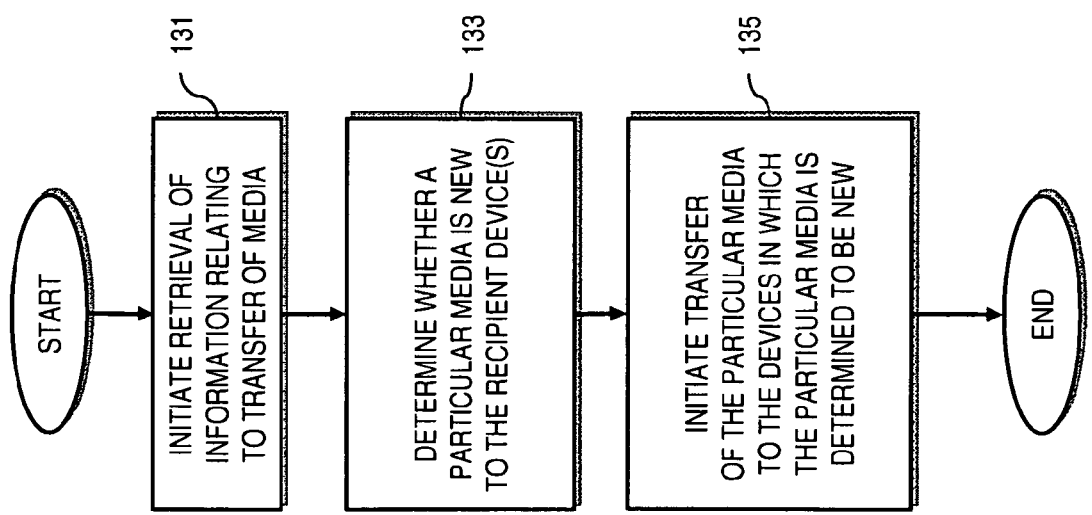

FIGS. 1A and 1B are, respectively, a diagram of a communication system capable of providing media transfer and ensuring data privacy through rich presence information, and a flowchart of media transfer process, according to certain embodiments. As shown in FIG. 1A, a system 100 comprises of a media platform 101 that includes a sharing manager 103 to manage the exchange of media among recipients (or users), and a privacy module 105 for restricting access to particular media designated by the user. Each of the users operates a wireless device 107 to access the media platform 101. According to certain embodiments, the devices 107 utilize a media sharing module 109 to activate the sharing or publishing of media with other users. It is contemplated that the device 107 can be any type of fixed terminal, mobile terminal, or portable terminal including desktop computers, laptop computers, handsets, stations, units, devices, multimedia tablets, Internet nodes, communicators, Personal Digital Assistants (PDAs), mobile phones, mobile communication devices, digital camera/camcorders, audio/video players, positioning devices, game devices, televisions, and/or the like, or any combination thereof.

Traditionally, the creation of privacy rules for communications services is a complex task, in that there are an indefinite number of controllable privacy combinations as the amount of contacts and amount of aggregated data increases. The problem of granting access (e.g., location based presence information in a multi-user framework) can be difficult from an end-user point of view; that is, the manner in which the user wishes to share private information requires careful treatment.

In this example, the media sharing manager 103 and the privacy module 105 can include several sub-modules to implement a media sharing protocol. It is contemplated that the functions of the sub-modules may be combined or performed by other components or logic of the media platform 101 or wireless device 107.

The media platform 101 can optimize media transfer over, for example, a "push" channel using information (e.g., history, rich presence, etc.) about previous transfers to the target device 107. For example, the media platform 101 can also factor in the "importance" or "relevance" of the shared media to the recipient, which, again, can depend on the history and the relationship between the sharer and the sharee. Such information can be collected over a specified or predetermined time interval and correlated to the particular type of media. Consequently, the media platform 101 optimizes data transfer separately for each recipient.

Media (or content) sharing involves a user authorizing other users within the network 113 to access the media owned or controlled by the user. It is contemplated that media sharing as discussed herein includes, for example, sharing of images, audio, video, or a combination of content, in addition to sharing of text and written material. The owner of the media may choose to "publish" the media (denoted as published media), which enables any other network user to have access to the media. Alternatively (or in addition to), the media can be "shared" (denoted as shared media) with a defined group of users such as those specified by the owner's contacts (e.g., found within a contact list or distribution list). That is, the owner may share its media with all or a subset of users in a contact list. Moreover, for privacy reasons, the owner may want to exclude some of the contacts from the authorized access list. One reason could be that the original content is not available, e.g., in case of images, a downscaled version may be the only version available instead of a full resolution version. Furthermore, some metadata of the content might be hidden, such as location where the content has been captured. This applies both for published and shared content.

As shown, the wireless devices 107 communicate with the media platform 101 over a communication network 113. By way of example, the communication network 113 of system 100 can include one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like. The communication network 113 can support resource sharing using, for example, a peer-to-peer protocol (e.g., BitTorrent).

By way of example, the devices 107 communicate with other devices (i.e., network nodes) on the communication network 113 using standard protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled "Interconnections Second Edition," by Radia Perlman, published September 1999.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In the example of FIG. 1A, the media platform 101 may act as a server to provide the sharing or publication of media under the control of the devices 107. The media platform 101 maintains the media that is to be shared in the shared media database 115, which also optionally stores metadata relating to the stored media. By way of example, the metadata can include media type, location, access method, etc. In addition, based on the two-way match of user's contact information on the media platform 101 (i.e., both are found in each other's contact list 111), metadata of published images can be delivered (e.g., "pushed") to the matching contacts. The media platform 101 also maintains information on which images are "new" to the recipients in database 119 (denoted as "media history information/user preferences" database). In the context of images, "new" images are defined as images that have not been yet viewed by the particular user. It is contemplated that the specific definition of "new" depends on the media and service. Push technology involves the delivery of content whereby the request for a given transaction originates with the publisher or the media platform 101. Services that have push capabilities have to consider optimizing the amount of data transferred to each recipient, e.g., device 107. For example, in a media sharing service, all shared and published media should not be pushed to all recipients as this could lead to a very high volume of network traffic, thereby triggering network performance degradation.

The operation of the media platform 101 in supporting efficient transfer of media is described with respect to FIG. 1B.

In the example of FIG. 1B, a process for transferring media based on history of the media pertaining to a particular recipient is explained. In one embodiment, the process is implemented in, for instance, a chip set including a processor and a memory as shown FIG. 9. In step 131, retrieval of information relating to the transfer of media is initiated. The information can include media history information, user preference information, and/or rich presence information as storage in databases 119 and 117, respectively. Rich presence information pertains to enhanced data associated with presence information, which permits a user to determine online presence and location of other users. In step 133, the media platform 101, via the sharing module 103, determines whether a particular media (e.g., image) is new to the recipient device(s) 107. The sharing module 103 then initiates transfer of the particular media to the devices 107 in which the particular media is determined to be new, as in step 135.

The above process can be triggered by, for example, when a user via device 107 seeks to share media. Upon instructions by the user, the device 107 using the media sharing module 109 transmits the media that is to be shared to media platform 101 for storage within a media and metadata database 115. Alternatively, the database 115 can be a data repository that is accessed directly without use of the media platform 101. It is contemplated that instead of the media itself, the device 107 can send data (e.g., link) relating to where the media can be found—that is, the media can reside in a different network element or data repository (e.g., website, etc.). The media sharing manager 103 pushes, or otherwise deliver, shared media (e.g., image) 115 to the selected recipients from user's contact list 111, including metadata of the images and, for instance, a low resolution version of the image binary, so the image can be viewed in offline mode as well.

In one embodiment, from published images, the platform 101 pushes only metadata (or, e.g., simply the publisher identifier (ID) and amount or size of content) so that the notification of new images can correctly be constructed on the mobile device 107. Furthermore, the media sharing manager 103 stores information about data sharing including, who has shared media to whom, data sharing history and user preferences in shared media information and preferences database 119.

However, if a user publishes images after sharing them, the published images have to be pushed to the shared image recipients, if the recipient has not yet viewed the shared images. This is performed to ensure that the new shared images are accessible in offline mode and the time order of images is maintained. This results in a situation that when an image is published, the image might be pushed only to a set of recipients, depending on whether the user has already shared images with those recipients.

Furthermore, the media platform 101 utilizes the privacy module 105 to create privacy rules governing access and transfer of the media. These rules can be utilized to establish groups (or feeds) for sharing of the media among users specified in the group. Such groups can be created based rich presence information stored in database 117 and/or user preferences stored in database 119. In this manner, the privacy module 105 can assign access rights using rules based on system privacy setup parameters or rules set by each individual user.

As mentioned, the efficient sharing or transfer of media can be based on the user's contact list or distribution list. This capability is illustrated in FIG. 2 in the context of restricting the sharing to users who are a part of each other's contact list.

Figure 2:
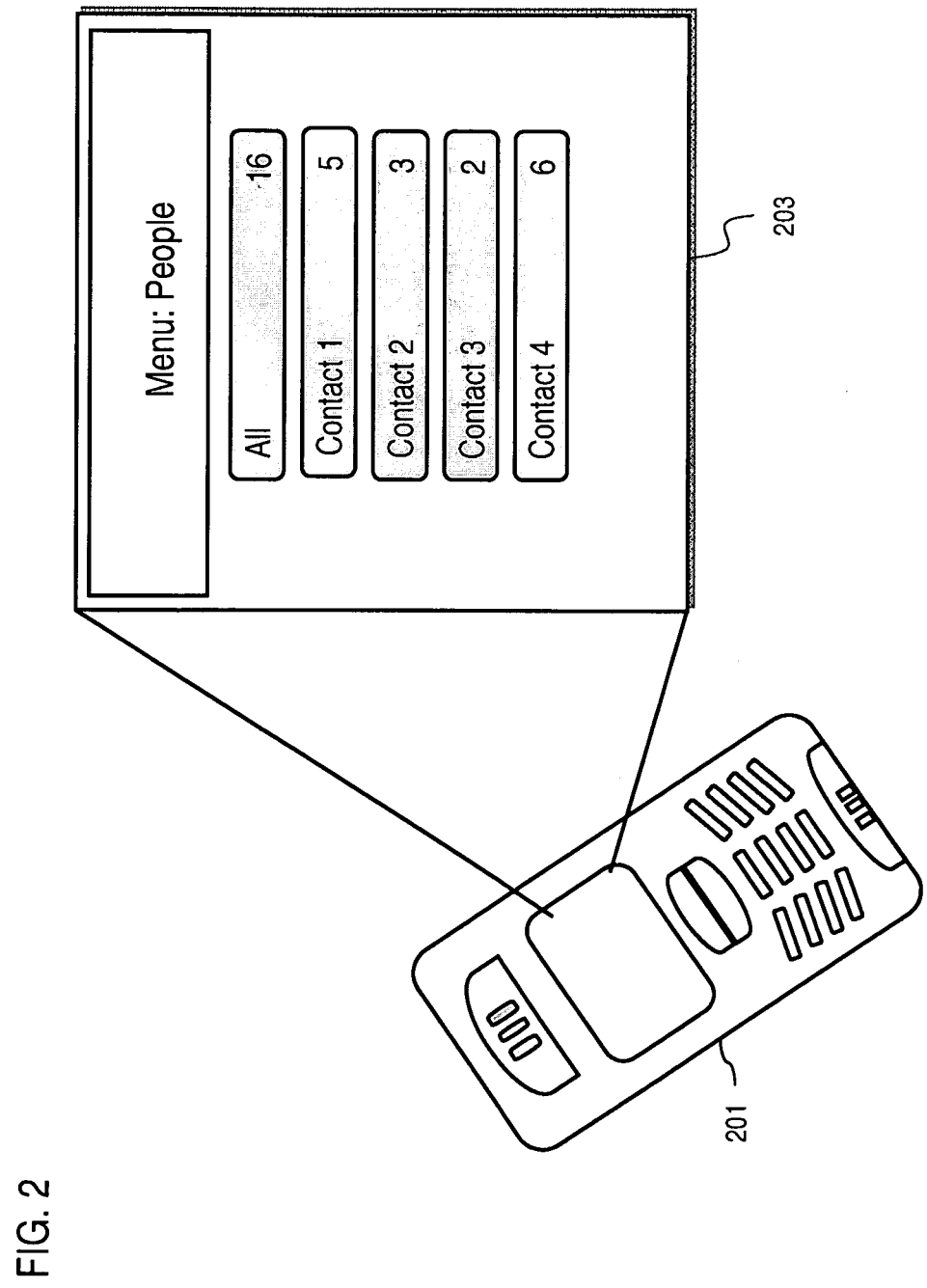
FIG. 2 is a diagram of a menu entry of shared items categorized by contacts, according to an exemplary embodiment.

FIG. 2 is a diagram of a menu entry of shared items categorized by contacts, according to an exemplary embodiment. A wireless device 201, such as a cellular phone capable of executing a browser client (not shown), has an "auto-friending" feature, which automatically assigns users who are in each others' contact lists as "friends." In addition, images shared or published by these users are shown under a "People" (or contacts) menu 203. The menu 203 includes one or more entries, which can be categorized by the specific users as shown in FIG. 2. In addition, shared and published images can be ordered by time under the name of person whom they originate from, and are accessible by clicking the person's name (e.g., "Contact 1"). If all images published and shared by these "automatic friends" are pushed to each person, the system 100 of FIG. 1A would be overloaded. In particular, the network 113 and users' devices 107 would be under significant excess load. In addition, the shared and published pictures are browsed in time order, and the new shared images are always accessible—even in offline mode. Therefore, not only the amount of data transferred has to be limited; the conditions such as time order of shared images and their availability even in offline mode need to be satisfied.

By way of example, if a user X publishes an image, the image is pushed to all recipients Y, who have new (unviewed) shared images from user X. It is noted that different users Y might have been shared different images in different times, and some of the users Y might already have viewed the shared images while others have not. The duplicative transfer of images is wasteful of device and network resources.

The system 100 utilizes the media platform 101, in certain embodiments, to address these issues by tracking and designating media that are new to a recipient, and disseminating only media that are new.

Figure 3:
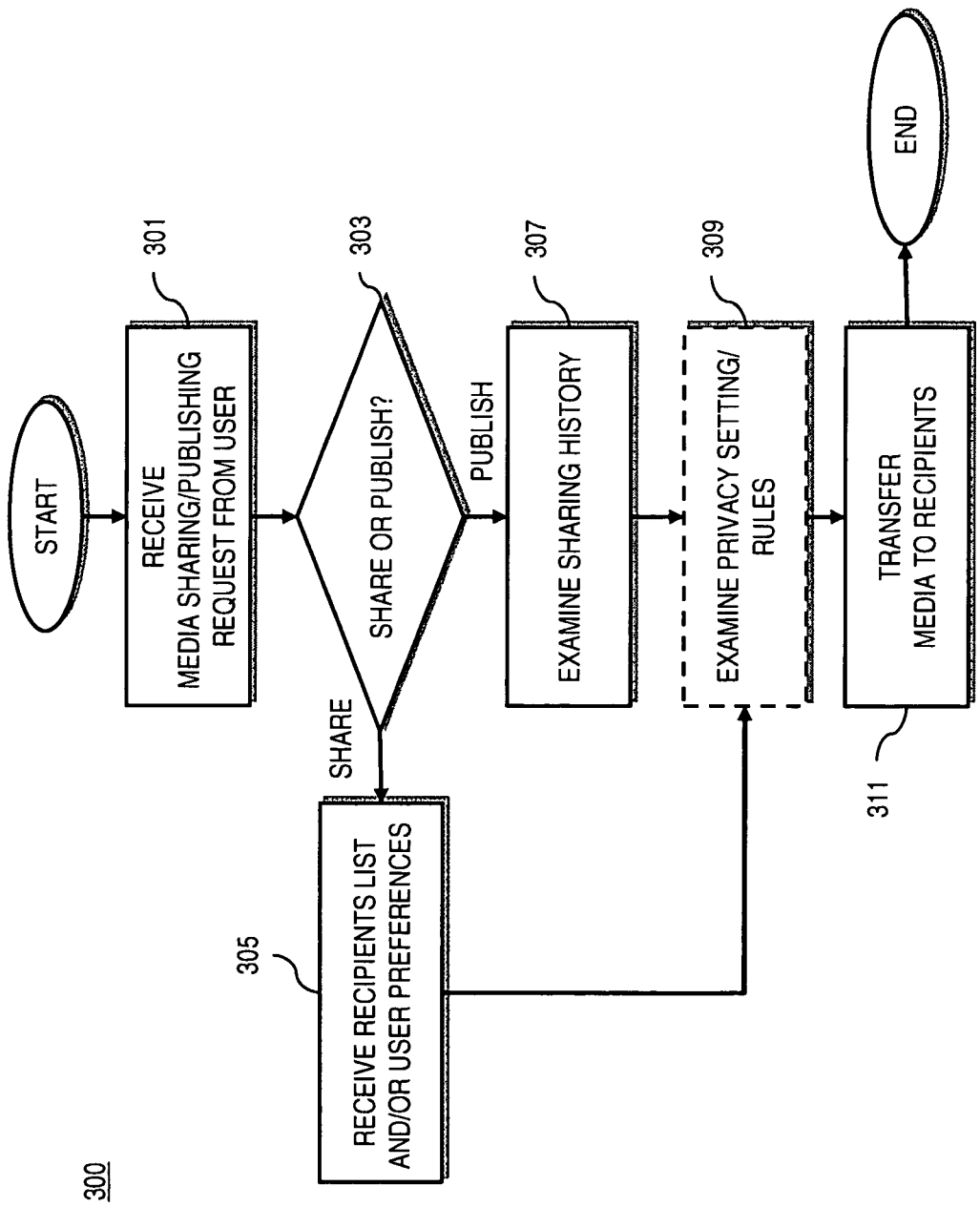
FIG. 3 is a flowchart of a process for optimizing media transfer, according to an exemplary embodiment.

FIG. 3 is a flowchart of a process for optimizing data transfer during media sharing, according to an exemplary embodiment. In step 301 the media platform 101 receives media sharing request from device 107. In step 303, the process determines whether the media is to be shared or published. If the media is to be shared, the process receives information on the recipients, i.e., contact list or recipients list. In one embodiment, the user device 107 can send user preference information as well. The media platform 101 can then store this preference information in database 119 for serving future requests for this particular user.

However, if the user is publishing media with no restriction on recipients, the media sharing manager 103 examines, for instance, the sharing history in database 119 (per step 301). The process, in one embodiment, can retrieve the recipients' preferences, i.e., the user might have specified certain restrictions, such as "don't push content" or "don't push content from this person" Based on the history, the media sharing manager 103 determines whether the recipients have already received the particular media. Consequently, if the media has previously been sent to certain recipients, the media need not be forwarded to them again.

In step 309, the privacy module 105 determines whether any privacy settings has been identified by the initiating user. That is, even though the recipient has not received the media before (i.e., "new" media), the privacy module 105 can nevertheless determine that the recipient does not have permission to receive the media according to privacy rules (established by the user). The construction of these rules are more fully described below with respect to FIG. 6. As indicated by the dashed outline (step 309), the step of examining the privacy settings and/or rules is optional. In step 311, the media platform 101 transfers the media to the appropriate recipients.

Figure 4:
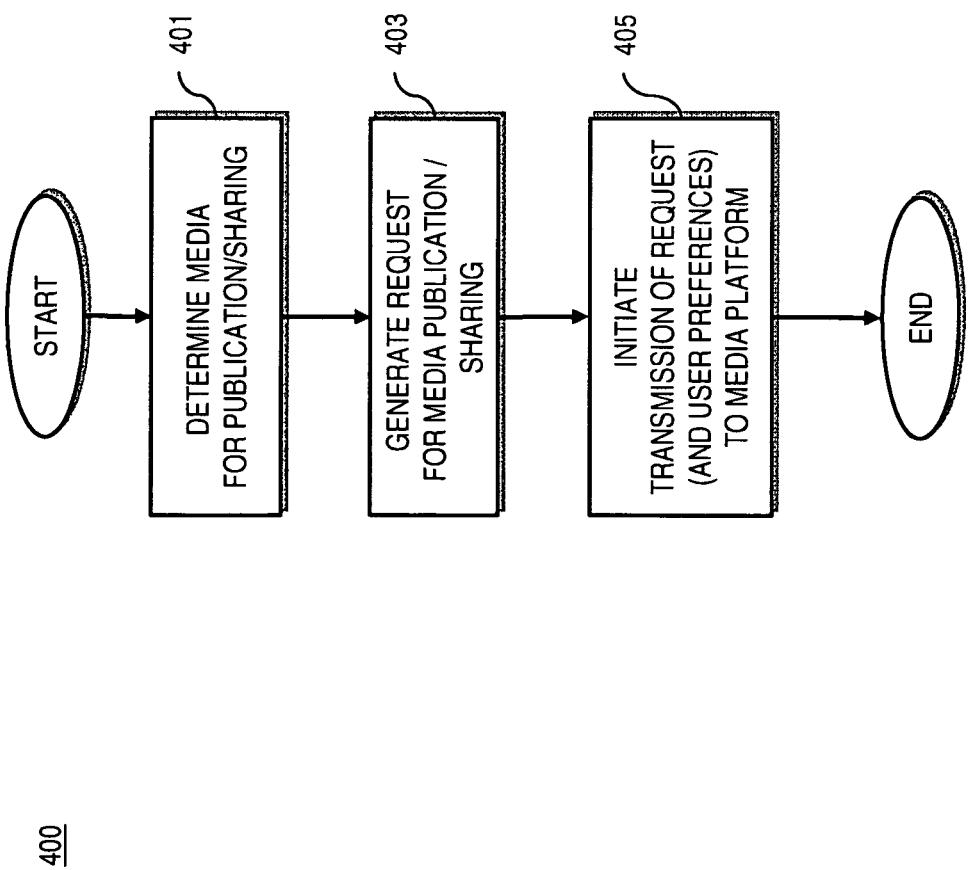
FIG. 4 is a flowchart of a process for a user to share media, according to an exemplary embodiment.

FIG. 4 is a flowchart of a process for a user to share media, according to an exemplary embodiment. For the purposes of illustration, this process is described with respect to the wireless device 107 the system 100 of FIG. 1A. First, a user of device 107 selects the media (e.g., images) that the user would like to share or publish. As such, the media sharing module 109 is invoked to determine, per step 401, the selected media based on the user input. In step 403, the media sharing module 109 generates a request to the media platform 101 for sharing/publishing the selected media. The request may also include preferences of the user; such information can relate to privacy rules and/or distribution lists, etc. In step 405, the media sharing module 109 initiates transmission of the request to media sharing manager 103 of platform 101.

Figure 5:
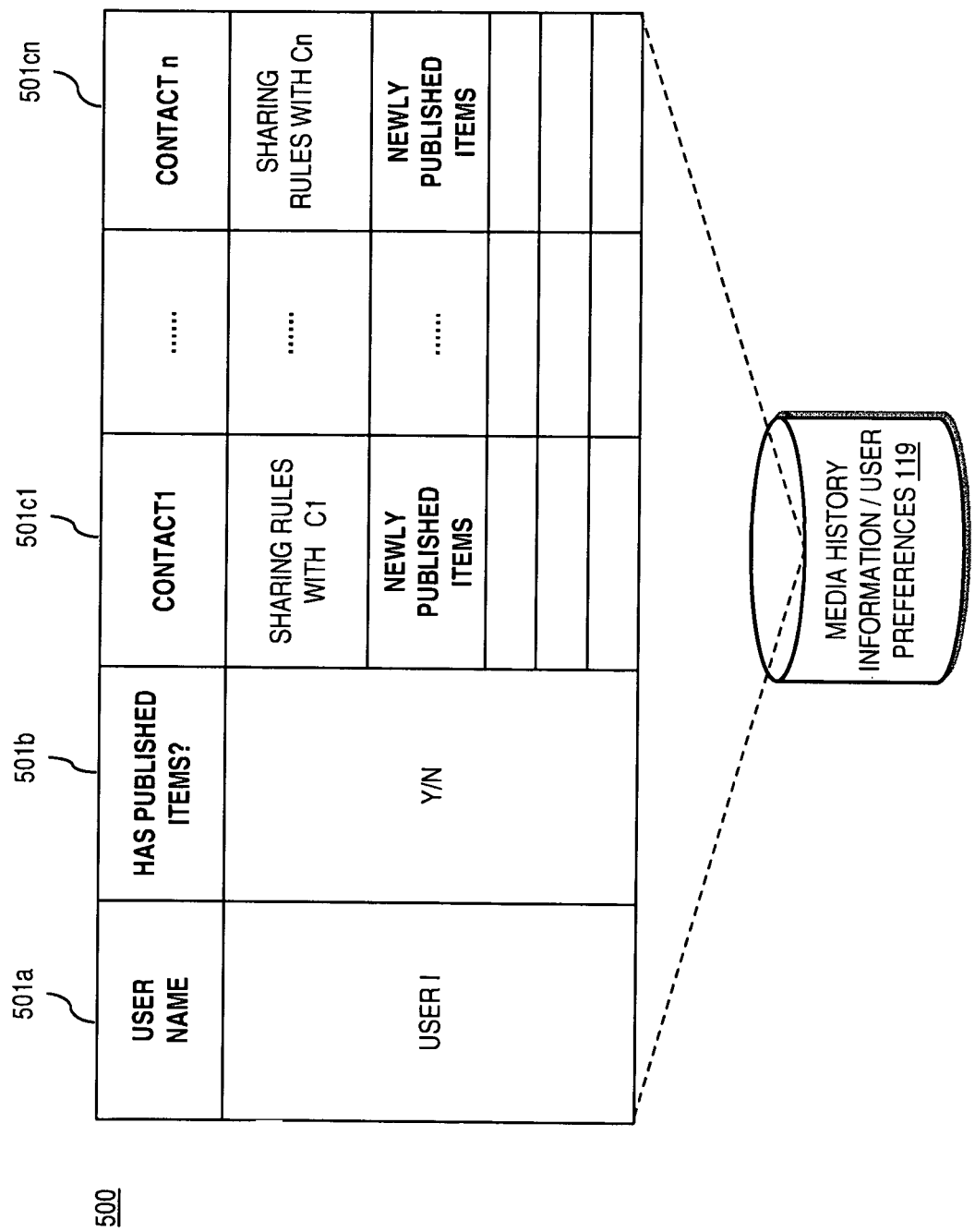
FIG. 5 is a diagram of a data structure or format for storing media sharing information, according to an exemplary embodiment.

FIG. 5 is a diagram of a data structure or format for storing media sharing information, according to an exemplary embodiment. As earlier discussed, the media platform 101 maintains the media history information/user preferences database 119. This database 119 logs such information as who has shared images to whom, and who has published images. For example, data structure 500 includes the following fields: User Name field 501a, Has Published Items field 501b, and Contacts 501c1-501cn. For each user in column 501a, the User Name field 501b indicates whether the corresponding user has published items that is to be accessible by all recipients. For example, a value "yes" within Has Published Items field 501b indicates that the published media can be transferred to all recipients; while a value "no" specifies that the media platform 101 should apply appropriate sharing rules and make the media available only to those users that the rules allow.

Data structure 500 also captures information about the user and the user's contacts: contacts $c_1$ to $c_n$ (501c1 to 50cn). These columns contain sharing rules for the specific contact drawn from system privacy set up and user preference (found in database 119). Furthermore, the media platform 101 stores, in one embodiment, a list of newly published media by the user for each one of the user's contacts. These newly published items for each contact are media that have not been already shared with this contact by the user, and thus, can be transferred to this contact.

Figure 6:
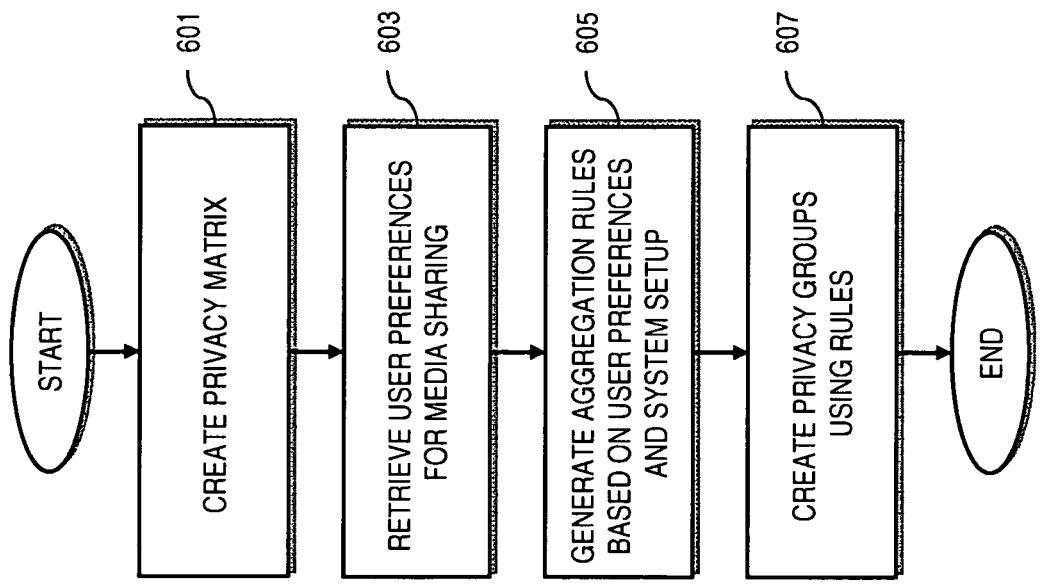
FIG. 6 is a flowchart of a process for setting privacy parameters for each user in a privacy matrix, according to an exemplary embodiment.
Figure 7:
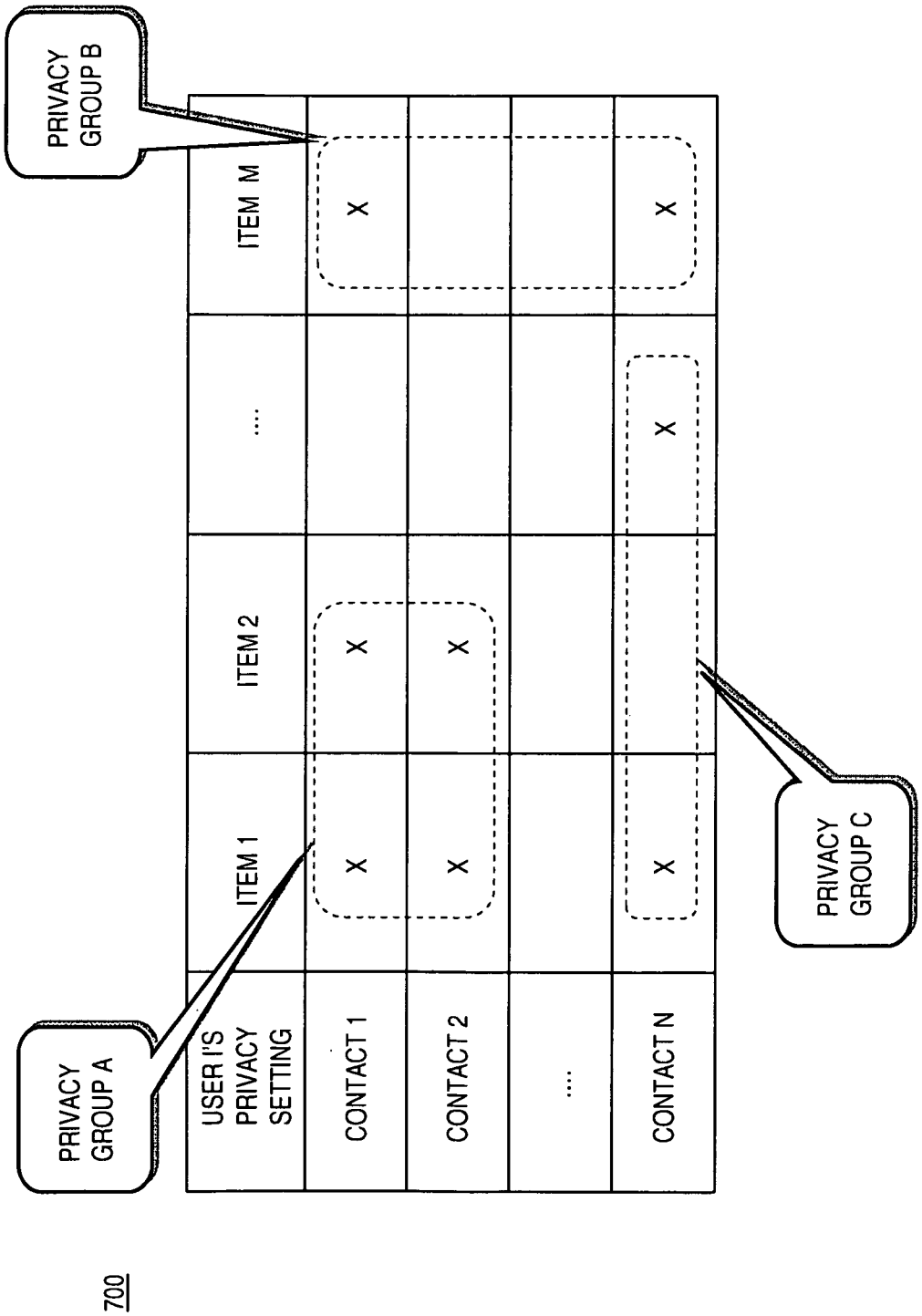
FIG. 7 is a diagram of a privacy matrix, according to an exemplary embodiment.

FIG. 6 is a flowchart of a process for setting privacy parameters for each user in a privacy matrix, according to an exemplary embodiment. In step 601, the privacy module 105 of media platform 101 creates a privacy matrix for each user. This matrix includes shared media properties for each user (as shown in FIG. 7 below), as well as rules for allowing aggregation of the media. The matrix, for example, can include axises that are formed of shared properties (e.g., rich presence data item (such location, song, etc.)) and of users.

In cases where a rule does not exist, the media platform 101 will deny media aggregation. According to certain embodiments, these rules are drawn from privacy preferences defined by user and also general privacy setup in the platform 101. The privacy module 105 can provide a wizard-based mechanism for rules creation, in which aggregation is permitted; that is, rules can be combined. For instance, a privacy constellation (i.e., feed/group) can be created, whereby a feed (e.g., define name, purpose, description, and image) may be defined and privacy groups can be specified. Also, properties can be attributed to the privacy groups for aggregation.

In step 603, user preferences are retrieved from the media history information/user preference database 119. Privacy rules are next generated, per step 605, based on user preferences and privacy setup parameters from the database 119. In step 607, privacy groups are created based on the generated rules.

FIG. 7 is a diagram of the privacy matrix, according to an exemplary embodiment. This exemplary privacy matrix 700 specifies how privacy groups are identified. The data structure 700 indicates that user I with n contacts (1 to N) and M corresponding shared items (1 to M). For this user, three different privacy groups A, B and C are defined. Privacy group A indicates that contacts 1 and 2 are allowed to access shared items 1 and 2, while contact 1 to N are all allowed to access shared item M and shared items B (B>2) to K (K<M) are only accessible to contact N. The media platform 101 can define sharing rules for each contact from the preferences of the matrix 700 in combination with any privacy rules or settings.

The above process advantageously provides a secure mechanism for users to share media, while minimizing the complexity of establishing privacy rules. Additionally, under the above arrangement, data transfer load on the network is reduced.

The processes described herein for optimizing media transfer an ensuring data privacy may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
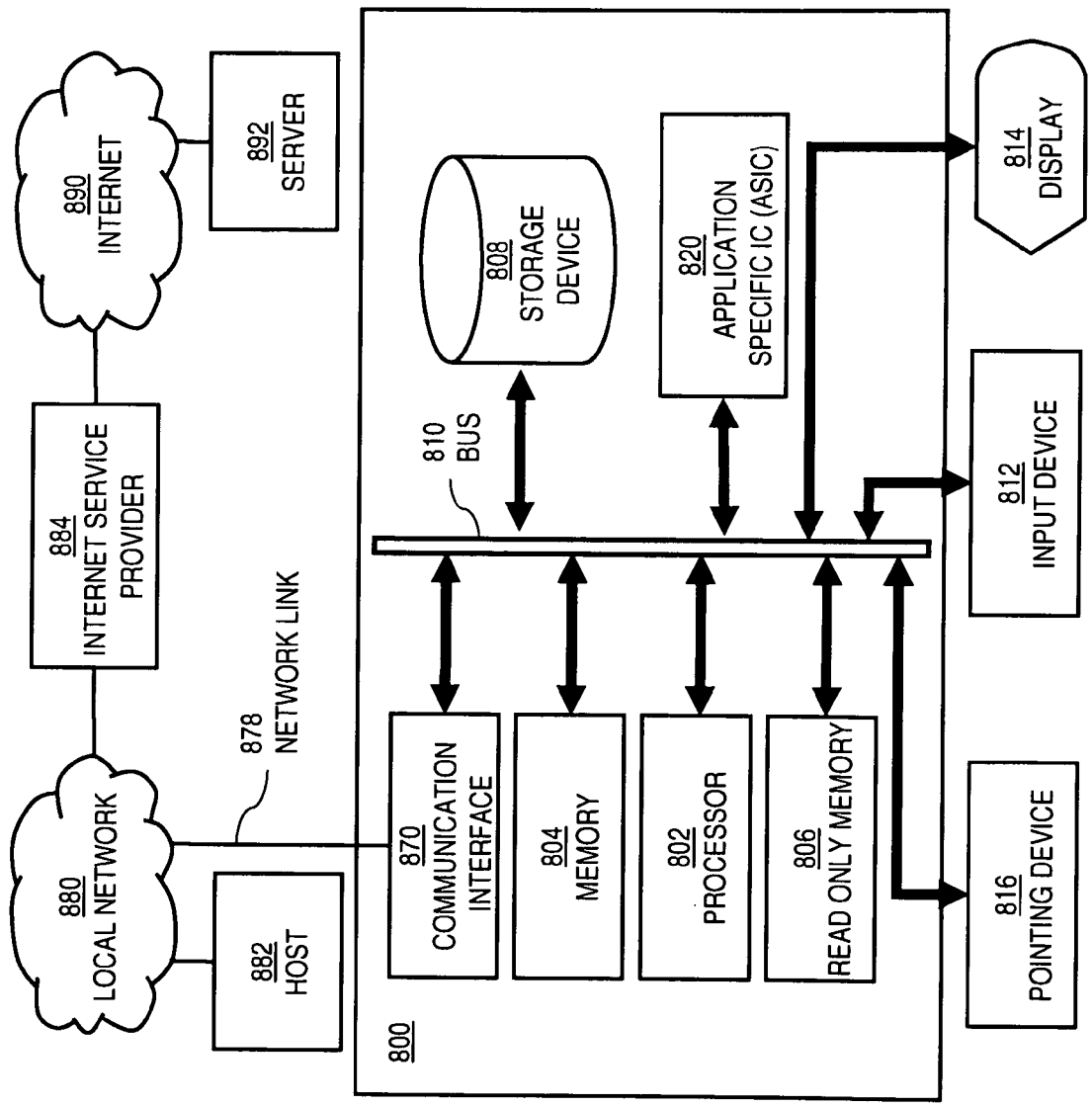
FIG. 8 is a diagram of hardware that can be used to implement an embodiment of the invention.

FIG. 8 illustrates a computer system 800 upon which an embodiment of the invention may be implemented. Computer system 800 is programmed to carry out the inventive functions described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 9:
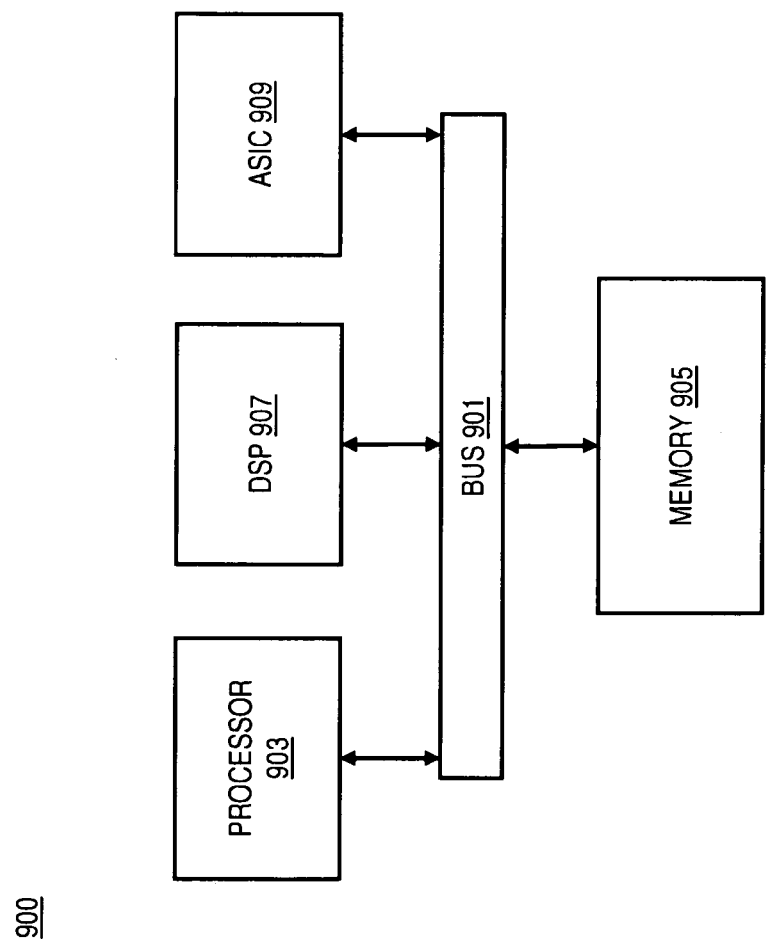
FIG. 9 is a diagram of a chip set that can be used to implement an embodiment of the invention.

FIG. 9 illustrates a chip set 900 upon which an embodiment of the invention may be implemented. Chip set 900 is programmed to carry out the inventive functions described herein and includes, for instance, the processor and memory components described with respect to FIG. 8 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-word signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein. The memory 905 also stores the data associated with or generated by the execution of the inventive steps.

Figure 10:
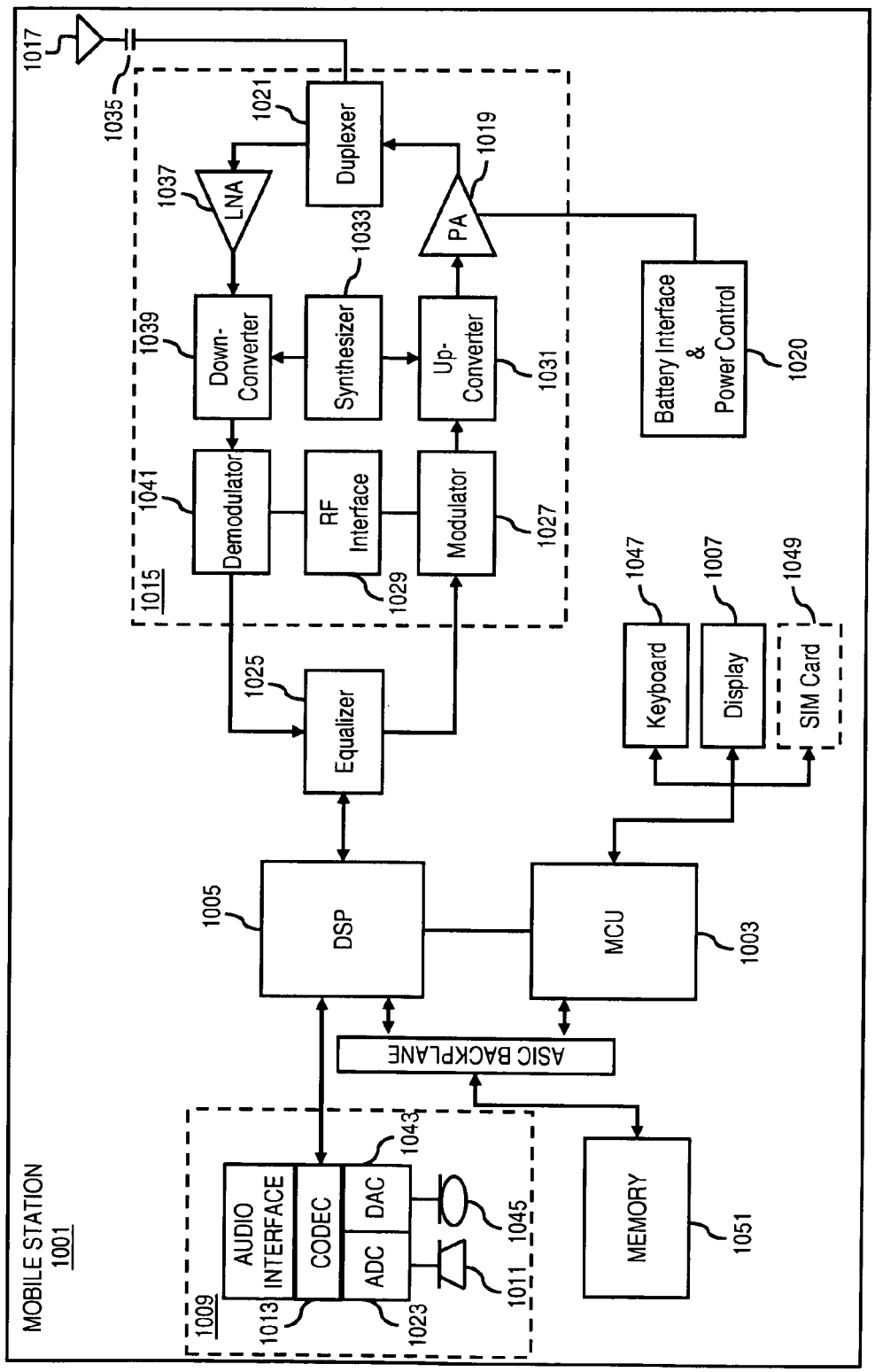
FIG. 10 is a diagram of a mobile station (e.g., handset) that can be used to implement an embodiment of the invention.

FIG. 10 is a diagram of exemplary components of a mobile station (e.g., handset) capable of operating in the system of FIG. 1, according to an exemplary embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In the exemplary embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The MCU 1003 delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A non-transitory computer-readable storage medium carrying one or more sequences of one or more instructions which, when executed by one or more processors, cause the one or more processors to at least perform the following steps:
    initiating retrieval of information relating to transfer of media by a media platform device to one or more destination devices;
    determining, by the media platform device, whether a particular media that is to be transferred to the one or more destination devices is new to the one or more destination devices based at least in part on the retrieved information;
    creating a privacy matrix for a user for restricting transfer of the particular media to at least one of the one or more destination devices based at least in part on user preference information specified by the user; and
    initiating transfer of the particular media to the destination devices with respect to which the particular media is determined to be new and with respect to the privacy matrix.

2. A non-transitory computer readable storage medium of claim 1, wherein the transfer is via a push mechanism, and the media includes shared media and published media.

3. A non-transitory computer readable storage medium of claim 2, wherein pushing of the shared media includes transfer of the particular media and associated metadata, and pushing of the published media includes transfer of only metadata associated with the particular media.

4. A non-transitory computer readable storage medium of claim 1, wherein the information includes which ones of the destination devices has shared media with other ones of the destination devices.

5. A non-transitory computer readable storage medium of claim 1, wherein the creating a privacy matrix comprises:
    initiating retrieval of the user preference information wherein the user preference information includes media sharing properties with respect to the one or more destination devices; and
    generating aggregation rules for grouping the one or more destination devices into privacy groups based at least in part on the user preference information.

6. An apparatus comprising a processor and a memory storing executable instructions that if executed cause the apparatus to at least perform the following:
    initiating retrieval of information relating to transfer of media by the apparatus to one or more destination devices;
    determining, by the apparatus, whether a particular media that is to be transferred to the one or more destination devices is new to the one or more destination devices based at least in part on the retrieved information;
    creating a privacy matrix for a user for restricting transfer of the particular media to at least one of the one or more destination devices based at least in part on user preference information specified by the user; and
    initiating transfer of the particular media to the destination devices with respect to which the particular media is determined to be new and with respect to the privacy matrix.

7. An apparatus of claim 6, wherein the transfer is via a push mechanism, and the media includes shared media and published media.

8. An apparatus of claim 7, wherein pushing of the shared media includes transfer of the particular media and associated metadata, and pushing of the published media includes transfer of only metadata associated with the particular media.

9. An apparatus of claim 6, wherein the information includes which ones of the destination devices has shared media with other ones of the destination devices.

10. An apparatus of claim 6, wherein the creating a privacy matrix comprises:
    initiating retrieval of the user preference information wherein the user preference information includes media sharing properties with respect to the one or more destination devices; and
    generating aggregation rules for grouping the one or more destination devices into privacy groups based at least in part on the user preference information.

11. An apparatus of claim 6, wherein the information includes one or more of media history information, user preference information and rich presence information.

12. A method comprising:
    initiating retrieval of information relating to transfer of media by a media platform device to one or more destination devices;
    determining, by the media platform device, whether a particular media that is to be transferred to the one or more destination devices is new to the one or more destination devices based at least in part on the retrieved information;
    creating a privacy matrix for a user for restricting transfer of the particular media to at least one of the one or more destination devices based at least in part on user preference information specified by the user;
    initiating transfer of the particular media to the destination devices with respect to which the particular media is determined to be new and with respect to the privacy matrix.

13. A method of claim 12, wherein the transfer is via a push mechanism, and the media includes shared media and published media.

14. A method of claim 13, wherein pushing of the shared media includes transfer of the particular media and associated metadata, and pushing of the published media includes transfer of only metadata associated with the particular media.

15. A method of claim 12, wherein the information includes which ones of the destination devices has shared media with other ones of the destination devices.

16. A method of claim 12, wherein the creating a privacy matrix comprises:
- initiating retrieval of the user preference information wherein the user preference information includes media sharing properties with respect to the one or more destination devices; and
- generating aggregation rules for grouping the one or more destination devices into privacy groups based at least in part on the user preference information.

17. A method of claim 12, wherein the information includes one or more of media history information, user preference information and rich presence information.

* * * * *